United States Patent
Shvabsky et al.

(10) Patent No.: US 12,499,342 B2
(45) Date of Patent: Dec. 16, 2025

(54) TIKI-SHAPED ANTENNA SYSTEM

(71) Applicant: Wiliot, Ltd., Caesarea (IL)

(72) Inventors: Michael Shvabsky, Tirat Carmel (IL); Alon Yehezkely, Haifa (IL); Oleg Becker, Holon (IL); Keren Barkai-Alon, Beit Hashmonai (IL)

(73) Assignee: Wiliot, Ltd., Caesarea (IL)

( * ) Notice: Subject to any disclaimer, the term of this patent is extended or adjusted under 35 U.S.C. 154(b) by 71 days.

(21) Appl. No.: 18/350,456

(22) Filed: Jul. 11, 2023

(65) Prior Publication Data
US 2025/0021782 A1    Jan. 16, 2025

(51) Int. Cl.
| | |
|---|---|
| *G06K 19/07* | (2006.01) |
| *H01Q 1/22* | (2006.01) |
| *H01Q 7/00* | (2006.01) |
| *H01Q 23/00* | (2006.01) |

(52) U.S. Cl.
CPC ....... *G06K 19/0724* (2013.01); *H01Q 1/2225* (2013.01); *H01Q 7/00* (2013.01); *H01Q 23/00* (2013.01)

(58) Field of Classification Search
CPC .... G06K 19/0724; H01Q 1/2225; H01Q 7/00; H01Q 23/00
See application file for complete search history.

(56) References Cited

U.S. PATENT DOCUMENTS

2021/0288395 A1* 9/2021 Yehezkely ............... H04W 4/70
2022/0391658 A1* 12/2022 Shimada ................. H01Q 9/24

FOREIGN PATENT DOCUMENTS

KR    20140134407 A  * 11/2014

* cited by examiner

*Primary Examiner* — Laura A Gudorf
(74) *Attorney, Agent, or Firm* — M&B IP Analysts, LLC (57) ABSTRACT

A tag, comprises: a first loop antenna connected to a chip for harvesting energy at a first frequency and being located on a first side of the chip; a second loop antenna connected to the chip for use in wireless communication using a frequency range and being located on a side of the chip opposite the first side; and a third loop antenna connected to the chip for harvesting energy at a frequency lower than the first frequency and the frequency range and having a portion of its loop (i) proximal to a portion of both the first and second antennas and (ii) extends parallel to a side of the chip perpendicular to the first side, and having a portion that is parallel to the first chip side; wherein a circumference of the third antenna is greater than a greatest circumference of the first and second antennas.

24 Claims, 6 Drawing Sheets

TIKI-SHAPED ANTENNA SYSTEM

TECHNICAL FIELD

This invention relates to wireless tags, and more specifically, to antennas for use by such tags.

BACKGROUND

Figure 1:
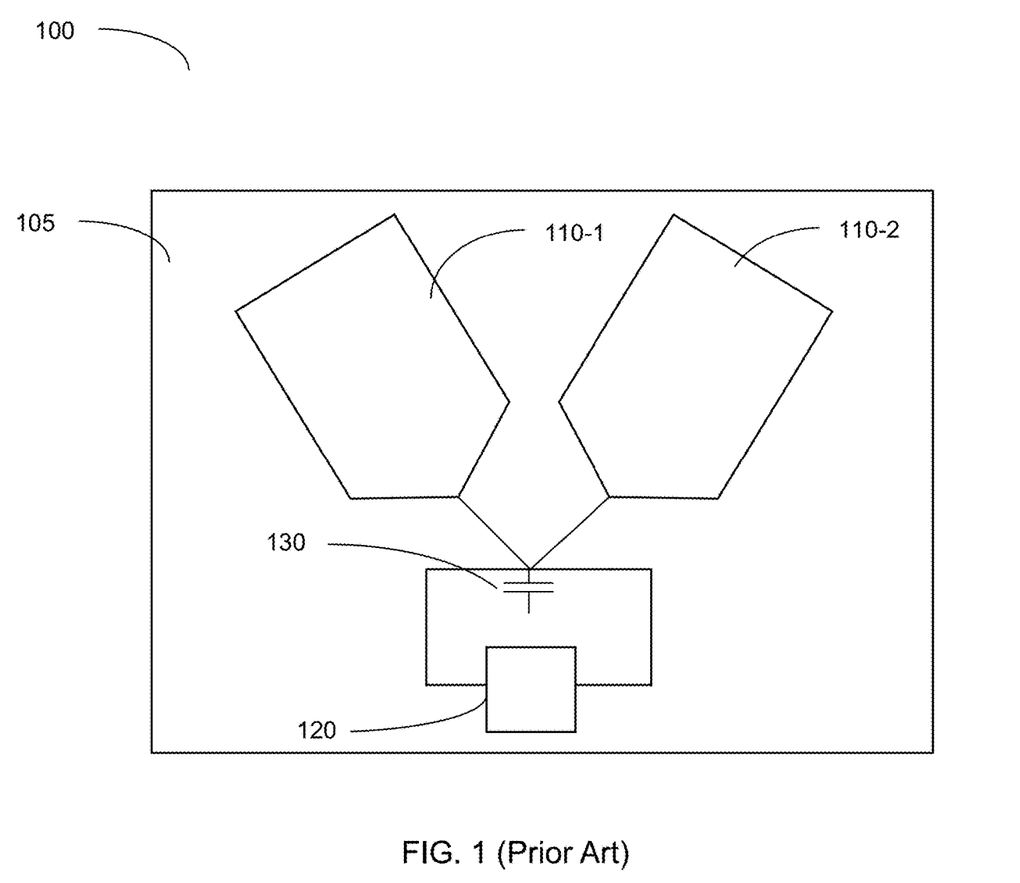
FIG. 1 shows a schematic diagram of an illustrative wireless tag.

FIG. 1 shows a schematic diagram of illustrative wireless tag 100, e.g., an Internet of Things (IoT) wireless tag, which as shown is a battery-less wireless tag. Wireless tag 100 includes an integrated circuit (IC or chip) 120 and at least one antenna, placed on inlay 105. In an embodiment, inlay 105 is a single layer inlay that has mounted thereon integrated circuit 120 connected to the at least one antenna e.g., using Anisotropic Conductive Paste (ACP). Chip 120 may include an Advanced RISC Machines (ARM) processor. Chip 120 may further contain firmware or have access to storage for storing program code and data.

Inlay 105 may be mounted on a substrate (not shown). The substrate is typically a single layer material that is suitable for mounting thereon a metal layer and/or an integrated circuit. For example, the substrate may be a printed circuit board (PCB), silicon, flexible printed circuits (FPC), low temperature co-fired ceramic (LTCC), polyethylene terephthalate (PET), Polyimide (PI), paper, and the like. The substrate may then be mounted, e.g., glued, to a support surface, e.g., cardboard or plastic.

For example, wireless tag 100 includes a pair of antennas 110-1 and 110-2 that are formed of metal in a metal layer that is part of inlay 105. First antenna 110-1 is utilized to harvest energy from ambient radio frequency (RF) signals and second antenna 110-2 is utilized to communicate, e.g., transmit and receive, wireless signals, such as Bluetooth Low Energy (BLE) signals. Each of antennas 110-1 and 110-2 may be of any known type, e.g., a loop antenna, a big loop with two feeds, a dipole antenna with two transformer feeds, and similar configurations, and they need not be the same type nor need they have the same dimensions. It should be noted that in various configurations transmitting second antenna 110-2 may be utilized to harvest energy as well. Furthermore, in some configurations, a plurality of antennas may be used to harvest energy, each of which is designed to harvest signals at a different frequency.

In an embodiment, wireless tag 100 also includes capacitor 130 that may be realized as an on-die capacitor, i.e., within integrated circuit 120, an external-to-integrated-circuit, passive capacitor, and the like. The energy harvesting functionality and use of energy is under the direction of the integrated circuit 120. In some arrangements, wireless tag 100 may include a printed battery.

Harvesting first antenna 110-1 of wireless tag 100 receives energy from RF signals at one or more frequency bands. Which bands can be effectively harvested by first antenna 110-1 typically is based on specific parameters of wireless tag 100. Such parameters may include a) various physical parameters, such as antenna length, thickness, conductivity, resistivity, and b) antenna properties, such as gain, radiation pattern, beam width, polarization, impedance, and the like. It should be noted that even minute differences or changes between the parameters of two antennas may result in each of the antennas harvesting at a different frequency.

Harvesting first antenna 110-1 of wireless tag 100 may be tuned to a frequency band where the wireless tag can most efficiently receive and transform RF signals received over that frequency band into a DC voltage. In an embodiment, the DC voltage is stored in capacitor 130, or on a similar power storage device.

The energy E on capacitor 130 is related to the DC voltage V by the following equation:

$$E = \frac{1}{2}CV^2,$$

where C is the capacitance of the capacitor. As discussed above, inlay 105 of wireless tag 100 may include multiple antennas, where more than one antenna may be configured as a separate harvester. In some arrangements, each harvesting antenna may be connected to a separate storage capacitor while in other arrangements there may be employed a single storage capacitor common to the multiple harvesting antennas. Such energy harvesting may allow a wireless tag to operate without requiring a battery source or other external power supply.

Bluetooth® and Bluetooth low energy (BLE) are personal area network protocols that enable wireless connectivity using the 2.4 GHz industrial, scientific and medical (ISM) band to distances of even more than 250 meters. A BLE signal may be used with low power consumption devices, such as battery-less wireless tags, e.g., wireless tag 100. Bluetooth and Bluetooth low energy communication operate in far field and their protocol can support multiple connections and multiple device connectivity at the same time. Other low energy communication protocols include LoRa, nRF, DECT® Ultra Low Energy (DECT ULE), Zigbee®, Z-Wave®, EnOcean®, and the like can be used for wireless tags in a similar manner to Bluetooth and BLE. For simplicity and pedagogical purposes, this disclosure may use BLE as an illustrative example, although the disclosure is applicable to wireless tags and testers that employ such other low energy communication protocols. When wireless tag 100 is a BLE device, it may include one or more antennas, e.g., antennas 110, for use in harvesting RF energy to power its operation as well as one or more antennas, e.g., antennas 110, for transmitting and receiving data via RF communication signals.

Because power in a battery-less tag is a is at a premium, it is desirable to ensure that the one or more harvesting antennas efficiently harvest the available energy. The ability to harvest energy is impacted by the antenna design. Similarly, it is typically desirable that the communication range of the tag be as large as possible, and such range is also impacted by the antenna design.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein relate to an antenna system for use in a wireless tag. The antenna system comprises: a first loop antenna for harvesting wireless energy at a first frequency and being adapted to be connected to a chip of the wireless tag and being located on a first side of the chip; a second loop antenna for use in wireless communication in accordance with a wireless protocol, wherein the second loop antenna is adapted to perform the wireless communication using at least a second frequency in a frequency range specified for use by the wireless protocol, the second loop antenna being adapted to be connected to the chip and being located on a second side of the chip that is opposite to the first side of the chip; and a third loop antenna for harvesting energy at a third frequency that is lower than both the first frequency and a lowest frequency of the frequency range and being adapted to be connected to the chip, the third loop antenna having a portion of its loop that (i) is proximal to a portion of the first loop antenna and a portion of the second loop antenna and (ii) extends substantially parallel to a third side of the chip, the third side of the chip being perpendicular to the first and second chip sides, the third loop antenna also having at least another portion that is substantially parallel to the first and second chip sides; wherein a circumference of the third loop antenna is greater than a greatest circumference of the first loop antenna and the second loop antenna.

Certain embodiments disclosed herein relate to an inlay for use in a wireless tag. The inlay comprises: a metallic layer; and a substrate layer; wherein the metallic layer is adhered to the substrate layer; wherein the metallic layer is adapted to have mounted thereon a chip, the chip being rectangular shaped so as to have four sides; and wherein there is formed of the metal layer at least: a first loop antenna for harvesting wireless energy at a first frequency and being adapted to be connected to the chip and being located on a first side of the chip; a second loop antenna for use in wireless communication in accordance with a wireless protocol, wherein the second loop antenna is adapted to perform the wireless communication using at least a second frequency in a frequency range specified for use by the wireless protocol, the second loop antenna being adapted to be connected to the chip and being located on a second side of the chip that is opposite to the first side of the chip; and a third loop antenna for harvesting energy at a third frequency that is lower than both the first frequency and a lowest frequency of the frequency range and being adapted to be connected to the chip, the third loop antenna having a portion of its loop that (i) is proximal to a portion of the first loop antenna and a portion of the second loop antenna and (ii) extends substantially parallel to a third side of the chip, the third side of the chip being perpendicular to the first and second chip sides, the third loop antenna also having at least another portion that is substantially parallel to the first and second chip sides; wherein a circumference of the third loop antenna is greater than a greatest circumference of the first loop antenna and the second loop antenna.

Certain embodiments disclosed herein relate to a wireless tag. The wireless tag, comprises: a first loop antenna for harvesting wireless energy at a first frequency and being adapted to be connected to a chip of the wireless tag and being located on a first side of the chip; a second loop antenna for use in wireless communication in accordance with a wireless protocol, wherein the second loop antenna is adapted to perform the wireless communication using at least a second frequency in a frequency range specified for use by the wireless protocol, the second loop antenna being adapted to be connected to the chip and being located on a second side of the chip that is opposite to the first side of the chip; and a third loop antenna for harvesting energy at a third frequency that is lower than both the first frequency and a lowest frequency of the frequency range and being adapted to be connected to the chip, the third loop antenna having a portion of its loop that (i) is proximal to a portion of the first loop antenna and a portion of the second loop antenna and (ii) extends substantially parallel to a third side of the chip, the third side of the chip being perpendicular to the first and second chip sides, the third loop antenna also having at least another portion that is substantially parallel to the first and second chip sides; wherein a circumference of the third loop antenna is greater than a greatest circumference of the first loop antenna and the second loop antenna.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

An improved antenna arrangement for wireless tags, e.g., battery-less wireless tags, that are harvesting on two different frequencies as well as communicating wirelessly, may be achieved, in accordance with the principles of this disclosure, by employing an arrangement of three loop antennas. Note that although the antennas described herein are referred to as "loop" antennas, they need not be circular shaped, as is well known and as will be seen from the illustrative embodiments disclosed herein. Each antenna is separately connected to a chip of the wireless tag. Further note that when the term "radiating" is used herein, the characterization referred to applies as well to receiving of wireless signals, as is well known to those of ordinary skill in the art.

A first of the loop antennas of the wireless tag is sized to efficiently harvest energy at a first frequency, the first frequency in some embodiments being in the range of the base frequency at which the wireless tag transmits and receives wireless information signals, and indeed, in some embodiments the wireless tag uses this harvesting frequency at times for transmission and reception of wireless signals. The first frequency is typically at a frequency transmitted by a tag reader, i.e., a device that communicates with the tag, for the purpose of providing at least some energy to the tag to use in powering the tag. The first of the loop antennas is sized so that it resonates with the chip of the wireless tag at the first frequency.

A second of the loop antennas of the wireless tag, is employed to transmit and receive wireless information signals typically using at least a second frequency that is within a frequency range specified for use by a wireless protocol, where the range of frequencies may include the first frequency, which thus results in the second of the loop antennas being sized substantially the same, i.e., having substantially the same circumference, as the first of the loop antenna. The first and second of the loop antennas are arranged to be on opposite sides of the chip of the wireless tag. The second of the loop antennas is sized so that it resonates with the chip of the wireless tag at least at one frequency within the frequency range, e.g., the second frequency. Note that the one frequency within the range may be the one that produces the maximum resonance while other frequencies within the range resonate but somewhat less so.

The third of the loop antennas is sized considerably larger than either of the first and second of the loop antennas and is arranged to be located within the vicinity of the first and second loop antennas and parallel thereto, e.g., emanating from and having long portions that extend substantially parallel to a third side of the chip that is perpendicular to the aforementioned two sides and short portions that are parallel to the aforementioned two sides. The third of the loop antennas is employed as a harvesting antenna at a third frequency that is substantially different from and lower than both the first frequency and the lowest frequency of the frequency range. The third of the loop antennas has a circumference so that it is tuned to resonate at the third frequency. As a result of the third frequency being much lower than both the first frequency and the lowest of the range of frequencies the circumference of the third of the loop antennas is larger than the circumference of other two antennas.

In accordance with an aspect of the disclosure, where the wireless tag is used with a communication protocol employing frequencies between 2.4 GHz and 2.48 GHz, the first harvesting antenna may be arranged to resonate at 2.48 GHZ, which is the first frequency. For example, such a first frequency may be the frequency used for BLE beacons, both short and long beacons. The second antenna used by the wireless tag for wireless communication, resonates with the chip of the wireless tag in a range between 2.4 GHz and 2.48 GHZ. The chip has the ability to change the frequency that it uses for communication. In an embodiment, the third antenna resonates with the chip at the 915 MHz band, which is the third frequency. In another embodiment, the third frequency may be 868 MHz. The third frequency may be supplied by the tag reader for the purpose of powering the tag or it may simply be radiation that exists in the environment as a result of its use by other devices. In either case, the energy at the third frequency can be harvested for use by the wireless tag.

In accordance with the principles of the disclosure, the third, larger antenna radiates as a big loop. In addition, in accordance with the principles of the disclosure, the first and second antennas are coupled via magnetic coupling to the third antenna so that they radiate as dipoles by way of the third antenna.

In accordance with an aspect of the invention, the third antenna is divided along its apex and apogee by respective inductor-capacitor (LC) band stop filters which effectively splits the large loop of the third antenna into two dipoles for the first frequency and the range of frequencies used for wireless communication. Advantageously, such an arrangement substantially reduces or eliminates current at the first frequency and at frequencies in the range on the horizontal parts of the loop, horizontal being shown hereinbelow as being parallel to the first and second sides and perpendicular to the third side of the chip, as noted above. Further advantageously, the LC filters reduce or eliminate dipole pattern tilts that would otherwise result for the first and second antennas in the 2.4 GHz to 2.48 GHz range with a small or negligible impact on the operation of the third antenna.

As will be appreciated by those of ordinary skill in the art, how close the each of the first and second of the loop antennas are to the third of the loop antenna affects the coupling therebetween.

Figure 2:
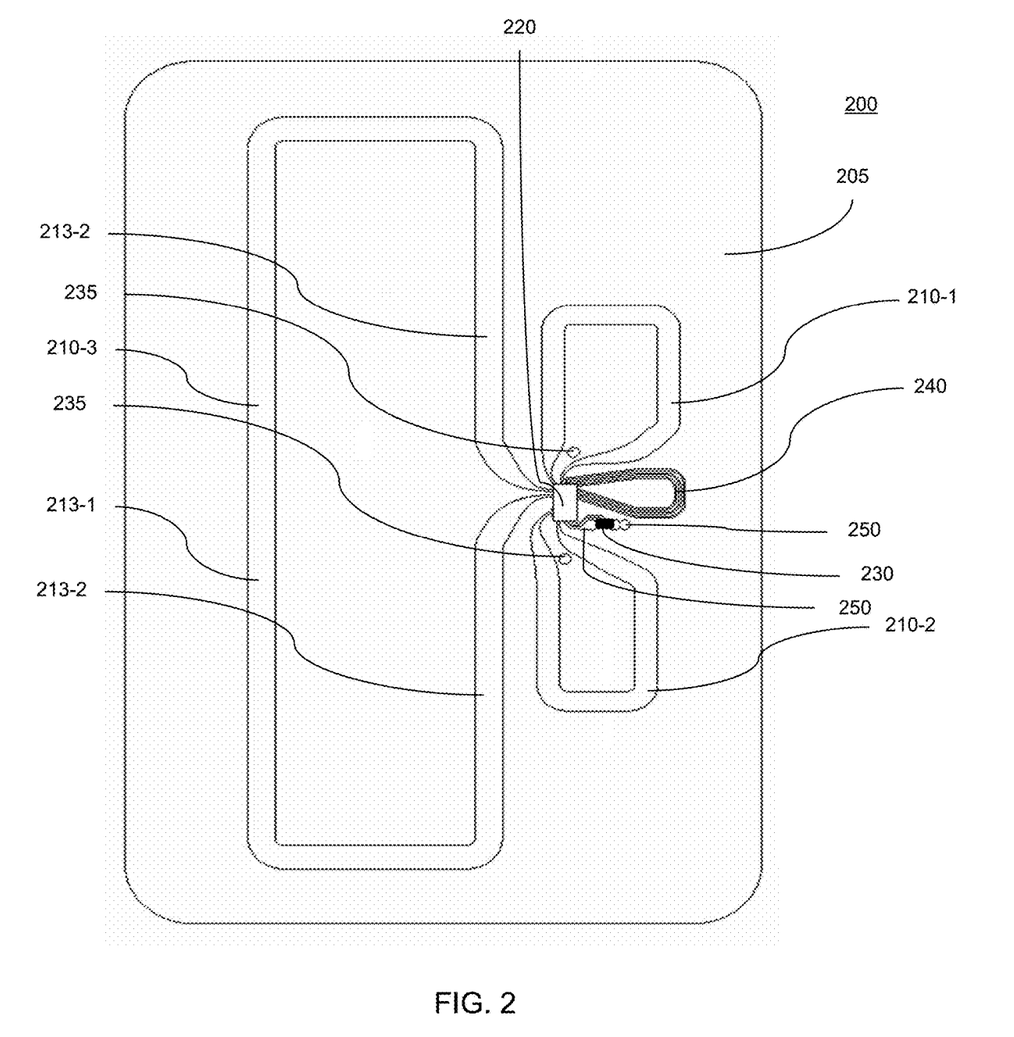
FIG. 2 shows a schematic diagram of an illustrative wireless arranged in accordance with the principles of the disclosure.

FIG. 2 shows a schematic diagram of illustrative wireless tag 200, e.g., an Internet of Things (IoT) wireless tag, which, for example, as shown, is a battery-less wireless tag, arranged in accordance with the principles of the disclosure. Wireless tag 200 includes an integrated circuit (IC or chip) 220 and at least three loop antennas, e.g., loop antennas 210-1, 210-2, and 210-3, which may be referred to as loop antennas 210 or antennas 210. Loop antennas 210-1, 210-2, and 210-3 are part of inlay 205. In an embodiment, inlay 205 includes a thin substrate layer, e.g., 50 µm inlay of PET, PI, or the like, on which there is a metal layer forming various structures such as antennas 210, wires, and contact points. The metal of the metal layer may be copper, aluminum, or the like. Integrated circuit 220 is mounted to inlay 205 so that it is connected to each of antennas 210-1, 210-2, and 210-3. Inlay 205 may then be mounted, e.g., glued, to a support surface, e.g., cardboard or plastic (not shown).

Note that first antenna 210-1 and second antenna 210-2 are each connected to and emanate from opposite sides of chip 220 and arranged in a substantially mirroring configuration while antenna 210-3 is connected to and emanates from a side of chip 220 that is perpendicular to the sides of chip 220 to which antennas 210-1 and 210-2 are each respectively coupled to and emanate from. Antenna 210-3 is located in the vicinity of the first and second antennas and has portions that extend parallel to corresponding portions of antennas 210-1 and 210-2. In this regard, antenna 210-3 emanates from and has long portions 213-1 and 213-2 that extend substantially parallel to a third side of chip 220, the third side being perpendicular to the aforementioned two sides, and has short portions that connect long portions 213-1 and 213-2 and run substantially parallel to the sides of chip 220 to which antennas 210-1 and 210-2 are each respectively coupled. Note that what appears to be physically two portions 213-2 effectively form one long portion 213-2 with regard to transmission and so they are treated as a single portion.

First antenna 210-1 is utilized to harvest energy from ambient RF signals at a first frequency. First antenna 210-1 is also referred to as harvesting antenna 210-1 or first harvesting antenna 210-1. First harvesting antenna 210-1 is sized so as to resonate with the chip of the wireless tag at the frequency for which it is designed to harvest energy. In one embodiment, first harvesting antenna 210-1 is designed to harvest energy at 2.48 GHZ and hence it is sized to resonate with the chip at 2.48 GHZ.

Second antenna 210-2 is utilized to communicate, e.g., transmit and receive, wireless information signals. Second antenna 210-2, also referred to as radio antenna 210-2 or BLE antenna 210-2. In one embodiment, Bluetooth Low Energy (BLE) signals and protocol are employed for communicating wireless signals. Such signals employ frequencies in a range between 2.4 GHz and 2.48 GHZ. In such an embodiment, second antenna 210-2 resonates with chip 220 of wireless tag 200 in the range of 2.4-2.48 GHz. There may be a frequency in the range at which the resonance is maximal.

Third antenna 210-3 is also a harvesting antenna, but it is designed to resonate with chip 220 at a lower frequency than first harvesting antenna 210-1, typically much lower. In one embodiment, while first antenna 210-1 harvests energy at 2.48 MHZ, and second antenna 210-2 is used for BLE communication and is tuned to resonate between 2.4 and 2.48 GHZ, as noted above, third antenna 210-3 is tuned to resonate at 915 MHz and its circumference has a length equal to about a half wavelength of a radio wave at 915 MHZ, inside the medium, which is all the materials that are around the antenna and which impacts the wavelength at the specified frequency. Such materials are described further hereinbelow. It should be kept in mind, that although FIG. 2 gives the impression that the antennas radiate directly to the air, that is not the case, as the structure of the wireless tag has antennas 210 actually being approximately in the middle of a sandwich of layers, as will be explained further hereinbelow.

The size of each of antennas 210 is dependent upon the inductance it needs to create. The inductance of each respective one of antennas 210 needs to resonate with the chip capacitance. For lower frequencies, e.g., for 915 MHz as opposed to 2.4 GHz, the inductance must be bigger, thus requiring that the antenna have a longer circumference. Due to its size, antenna 210-3 has good enough radiation that no further enhancement is required, unlike for smaller antennas 210-1 and 210-2.

Antennas 210-1 and 210-2 are sized to be about ~28% of the wavelength when used for 2.4 GHz to 2.48 GHZ, as noted above. Thus, antennas 210-1 and 210-2 are considered to be "small" and antenna 210-3 is considered to be "big".

In the embodiment shown, antennas 210-1, 210-2, and 210-3 are all substantially rectangular shaped with rounded corners. One side of each of antennas 210 is not quite straight in order to facilitate connection to chip 220.

Also shown in FIG. 2 as part of wireless tag 200 is capacitor 230, inductor 240, and test points 250. Capacitor 230 is used to store the energy harvested by harvesting antennas 210-1 and 210-3. Inductor 240 is employed as part of an oscillator used by chip 220. Test points 250 may be extensions of the wiring points at which capacitor 230 is connected to chip 220. Test points 250 enable connection to the chip for enabling sensing and failure analysis. Other test points for testing various aspects of chip 220 may also be included in other embodiments.

In FIG. 2, antennas 210-1 and 210-2 couple magnetically to antenna 210-3 which acts as a single dipole and radiates the signal from each of antennas 210-1 and 210-2. However, using the arrangement of FIG. 2, the transmission dipole pattern tilt for harvesting antenna 210-1 is 45 degrees up with respect to the horizontal plane, namely, the plane that is perpendicular to the plane of the tag and the vertical parts of antenna 210-3, i.e., perpendicular to long portions 213-1 and 213-2 of antenna 210-3, while the transmission dipole pattern tilt for radio antenna 210-2 is 45 degrees down. with respect to this plane.

Also shown in FIG. 2 are points 235 which act as fiducial markers and may be employed by a pick and place machine in the process of placing chip 220 at the proper location.

Figure 3:
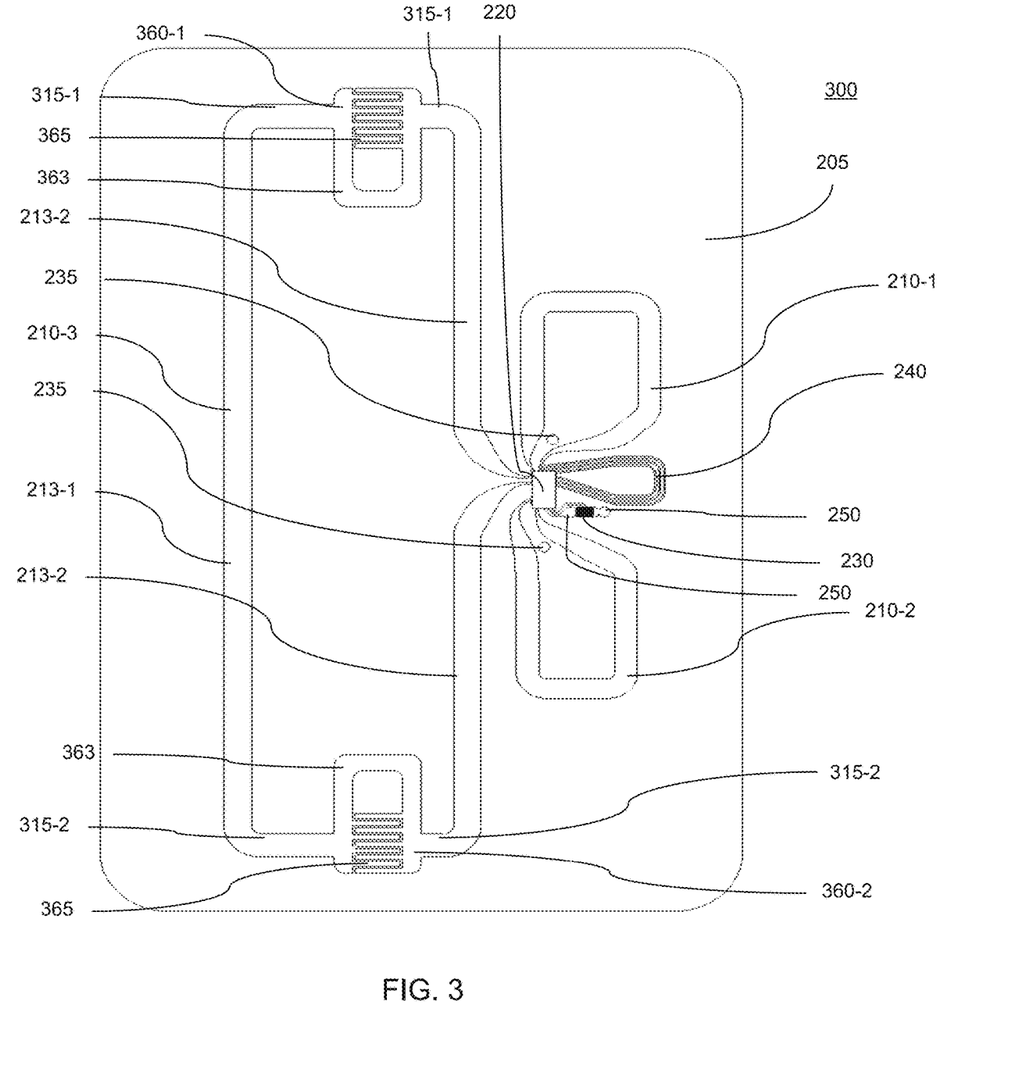
FIG. 3 shows a schematic diagram of another illustrative wireless tag arranged in accordance with the principles of the disclosure.

FIG. 3 shows a schematic diagram of illustrative wireless tag 300, e.g., an Internet of Things (IoT) wireless tag, which for example, as shown, is a battery-less wireless tag, arranged in accordance with the principles of the disclosure. Wireless tag 300 may be made with the same layer structure as wireless tag 200 and generally the same component layout, but it further incorporates LC band stop filters 360-1 and 360-2 in respective ones of short portions 315-1 and 315-2 of antenna 210-3.

Each of LC filters 360 is formed of an inductor in parallel with a capacitor. Effectively, at the macro-circuit level, each inductor of one of LC filters 360 is formed by a respective loop portion 363 of each of LC filters 360 while the capacitor is formed by the interdigitated fingers 365 of each of LC filters 360.

The structure of each LC filter 360 is arranged so as to have a high impedance at the frequency at which antennas 210-1 and 210-2 resonate, e.g., at 2.4 GHz and the range between 2.4 GHZ and 2.48 GHz for the embodiment described hereinabove for BLE. As such, operationally, LC filters 360 prevent or minimize current on short portions 315-1 and 315-2 of third antenna 210-3 at the frequencies of resonance of antennas 210-1 and 210-2 thereby causing long portions 213-1 and 213-2 of third antenna 210-3 to be effectively electrically disconnected at such frequencies, and hence each of long portions 213-1 and 213-2 of third antenna 210-3 acts as an independent dipole at such frequencies.

Advantageously, use of LC filters 360 prevents transmission dipole pattern tilt, which, as noted above, occurs when LC filters 360 are not employed, so that the resulting dipole transmission pattern's maxima for wireless tag 300 is substantially in the horizontal plane noted hereinabove. In this regard, it should be appreciated that use of LC filters 360 somewhat degrades the performance of harvesting at 915 MHz but as compensation therefor the performance at 2.4 GHz and 2.4-2.8 GHz is improved, in the desired plane.

Each LC filter 360 is designed so as to meet the requirement of:

$$f = \frac{1}{\sqrt{LC}}$$

where f is the frequency of operation, L is the inductance of each of LC filters 360 and C is the capacitance of each of LC filters 360. While this may be calculated, it is typically faster to use guess and check. Thus, it can be seen that there are tradeoffs that an implementer may make in the size of the inductor and the number of fingers employed to implement the capacitor as changing these parameters affects the frequency of operation of each LC filter 360.

Figure 4:
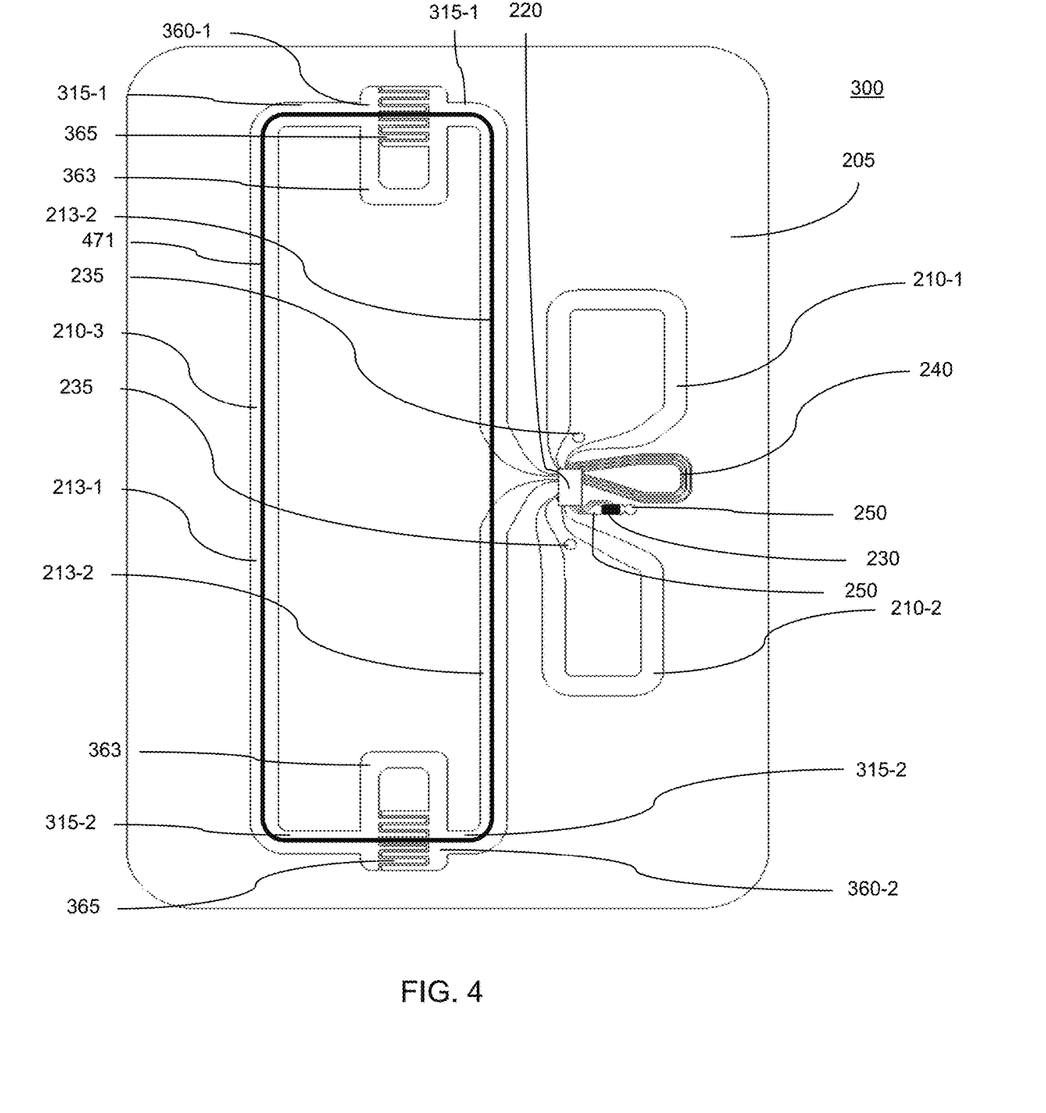
FIG. 4 shows the wireless tag of FIG. 3 with a main radiation element of the third antenna overlaid thereon.

FIG. 4 shows illustrative wireless tag 300 with radiation element 471 for third antenna 210-3 overlaid on antenna 210-3, e.g., when antenna 210-3 is tuned to 915 MHz. As shown, in such a case, third antenna 210-3 radiates as a loop, e.g., a big loop with respect to the size of the loop antennas 210-1 and 210-2. Note that at the lower frequency to which antenna 210-3 is tuned LC filters 360 do not have such a high impedance and so they allow current to pass between long portions 213-1 and 213-2 so that a complete loop is formed.

Figure 5:
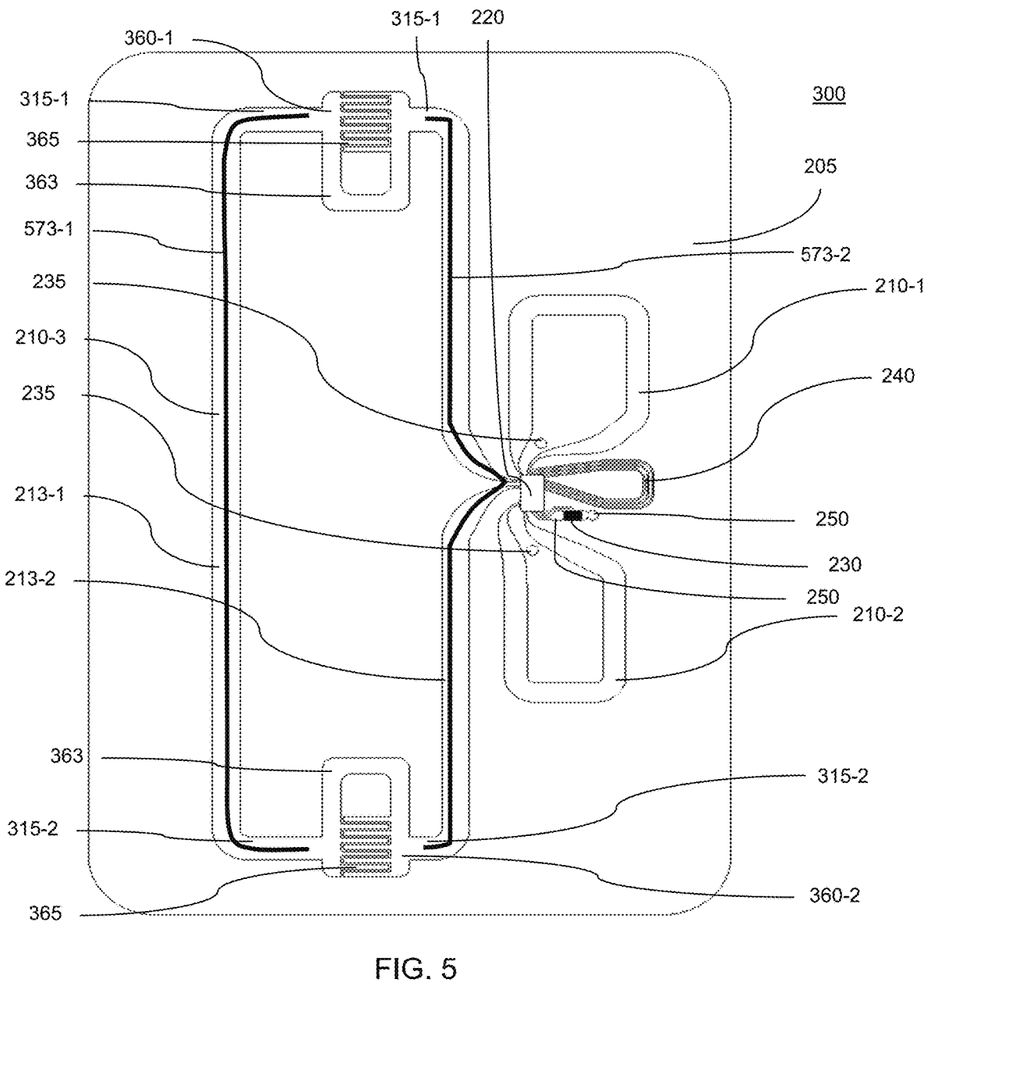
FIG. 5 shows the wireless tag of FIG. 3 with the main radiation elements of the first and second antennas overlaid thereon, these radiation elements being the result of the coupling of first and second antennas of the wireless tag to the third antenna.

FIG. 5 shows illustrative wireless tag 300 with the main radiation elements of first antenna 210-1 and second antenna 210-2 overlaid thereon. These radiation elements are the result of the coupling of first antenna 210-1 and second antenna 210-2 to third antenna 210-3. More specifically, FIG. 5 shows the resulting radiation element for first antenna 210-1 and second antenna 210-2 which is overlaid on third antenna 210-3, the resulting radiation element being comprised of two dipoles, 573-1 and 573-2, which results from the coupling of antennas 210-1 and 210-2 to third antenna 210-3 when antennas 210-1 and 210-2 resonate with chip 220 at a much higher frequency than that at which third antenna 210-3 resonates with chip 220, e.g., where first antenna 210-1 resonates with chip 220 at 2.4 GHZ, second antenna 210-2 resonates with chip 220 at 2.4 to 2.48 GHZ, and third antenna 210-3 resonates at 915 MHz. Note that at these higher frequencies LC filters 360 have a high impedance such that they block current from passing between long portions 213-1 and 213-2 of antenna 210-3 thus preventing a complete loop from being formed and instead resulting in two separate dipoles 573-1 and 573-2. Further note that each of antennas 210-1 and 210-2 causes an almost identical radiation pattern to be formed, hence for pedagogical purposes only one FIG. is being shown but in practice the transmission from antenna 210-3 caused by antennas 210-1 and 210-2 will actually be the superposition of the signals induced in antenna 210-3 from both of antennas 210-1 and 210-2. Furthermore, the total transmission will be the induced signals via dipoles 573-1 and 573-2 along with the actual transmission from each of antennas 210-1 and 210-2.

Figure 6:
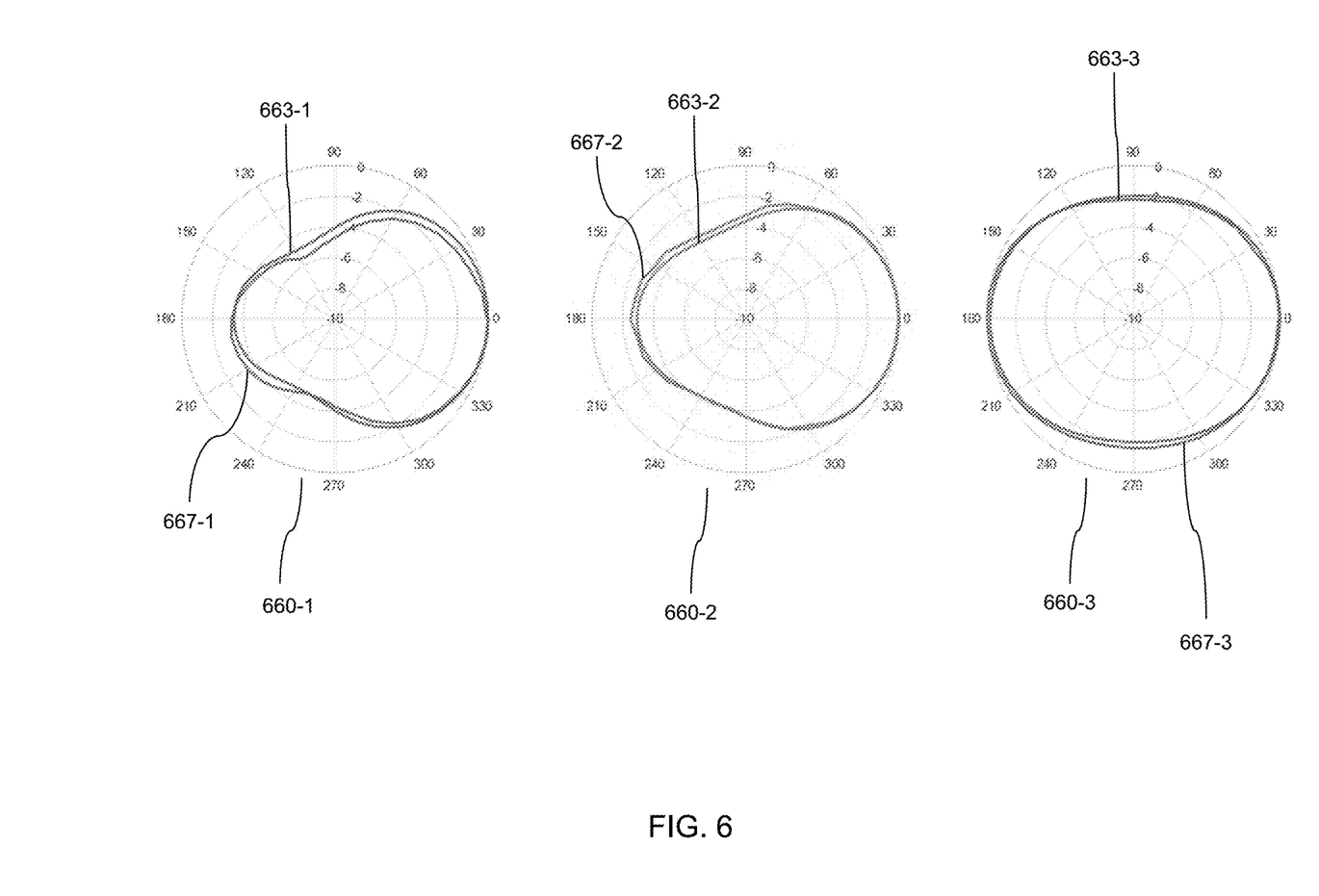
FIG. 6 shows illustrative azimuthal radiation patterns for each of the first, second, and third antennas of FIG. 3.

FIG. 6 shows illustrative azimuthal radiation patterns 660-1, 660-2, and 660-3. Radiation pattern 660-1 corresponds to harvesting antenna 210-1 when designed to resonate with chip 220 at 2.4 GHZ, radiation pattern 660-2 corresponds to BLE antenna 210-2 when designed to resonate with chip 220 at 2.4-2.48 GHZ, and radiation pattern 660-3 corresponds to lower frequency harvesting antenna 210-3 when designed to resonate with chip 220 at 915 MHz. The outer numbers around each radiation pattern is the degrees and the radial axis indicates gain in respect to the maximum gain of the antenna where 0 dB is the maximum gain of each of antennas 201. The phi polarization can also be called vertical polarization.

Each of radiation patterns 660-1, 660-2, and 660-3 shows two curves, one that was derived by simulation for a tag and one that corresponds to the actual measurement for the tag that was simulated. Curves 663-1, 663-2, and 663-3 are the respective simulated curves while curves 667-1, 667-2, and 667-3 are the measured curves. Note that the simulation and actual measurements correspond quite closely.

The foregoing describes the general structure and operating principles of the antenna structure for use with a wireless tag. However, as is well known, antenna design typically involves the making by an implementer of various tradeoffs for any particular implementation. Below is discussed various factors that affect antenna performance and considerations that may be taken into account by an implementer implementing such an antenna system in a wireless tag assuming that the frequency of operation is kept the same.

One factor to consider is how close each of antennas 210-1 and 210-2 are to antenna 210-3. The distance between antennas 210-1 and 210-2 and antenna 210-3 affects the coupling between antennas 210-1 and 210-2 and antenna 210-3 and how much power will be transferred therebetween. Changing the distance results in different levels of coupling using the same input power and the results of such changes can be seen in radiation patterns developed at different distances. Sensitivity testing may be performed to determine a desired distance.

Another factor to consider is various components of the tag that are near the antennas since all of the components couple to each other. Thus, not only can other components couple to the antenna and affect harvesting and wireless communication performance but the harvesting and wireless communication signals signals may couple to other components and thereby affect their operation. As such, for example, even the test points in the vicinity of the chip for testing it have to be taken into account. Thus, such other components need to be placed so that the coupling between them is kept to acceptable levels, i.e., the performance of the components is not unduly affected by their placement. Typically, this can be achieved by having sufficient distance between the components so that they don't interfere with each other in a manner that negatively affects the performance of the wireless tag.

The wireless tag structure, e.g., the use of different materials to manufacture the wireless tag, may affect the wireless coupling of the antennas and change, e.g., shift, the optimum frequencies for the tag's operation. Likewise, the size of the wireless tag may also affect the wireless coupling and the optimum frequencies. It is thus sometimes possible to compensate for a change of material by changing the size of the wireless tag. The foregoing applies not only to the horizontal and vertical dimensions but also to the thickness of the wireless tag. Given a particular initial wireless tag design, for small changes in density, e.g., when changing the material of the white layer or the light blocking material which are noted below, there is typically no need to change the arrangement of the LC filters as they are wideband. For larger changes in density or thickness, e.g., changing the material on which the wireless tag is mounted, e.g., from cardboard to plastic, it may be necessary to also change the design of LC filters to better account for the change in density using the principles disclosed herein.

For example, when the wireless tag is mounted on a plastic support surface, which is denser than a cardboard support surface, the size of all antennas 210-1, 210-2, and 210-3 may need to be made smaller than when the wireless tag is mounted on a cardboard support surface. For example, when wireless tag 300 is mounted on a cardboard surface it may be sized to be 19.23 mm×40.5 mm, i.e., 19.23 mm horizontally and 40.5 mm vertically when oriented as shown in FIG. 3. However, when the wireless tag is mounted on a plastic surface, i.e., a denser material, it may need to be sized to be 18.82 mm×38.59 mm so that it is slightly smaller to help compensate for the different material.

In an illustrative embodiment, a wireless tag has the following layers, listed from top to bottom. A white face material, e.g., white PET or white paper, which is a material which may be printed on. A glue layer. A light blocking material layer, e.g., a black, light blocking polyester film (BHO). The white face layer, the glue, and the light blocking material, are together called the conversion layer. Next there is a metal layer, the chip, being connect to the metal layer by an anisotropic conductive paste that is placed between the chip and the metal layer and also between any other components that are mounted on the metal layer. In one embodiment, the anisotropic paste is a glue with metal particles that conduct only in the Z-direction, i.e., perpendicular to the white face material, so that connections are made between the chip and the metal layer. The metal layer may be copper, aluminum, or some other metal and contains wire traces, including antennas 210, mounting points for chip 220, mounting points for other components, test points, possibly other circuitry, and the like. Then there is an adhesive layer, e.g., 7 micrometers thick, a PET or polyimide layer, e.g., 50 micrometers thick, a further glue layer. There is also a supporting surface, referred to as a release liner, which is something that the tag can be stuck to but allows the wireless tag to be peeled off therefrom. The wireless tag, after being peeled off is still sticky from the glue under the PET or polyimide layer, and it can then be stuck on support surface, e.g., cardboard or plastic. The metal layer, the adhesive layer, and the PET layer are together referred to as an inlay. The materials of the various layers are at the discretion of the implementer and are often selected in conjunction with various suppliers.

In view of the foregoing, the following design tweaking flows may be implemented by an implementer.

Should better harvesting at 2.48 GHz be desired, make the distance between antenna 201-1 and antenna 201-3 smaller. Similarly, should better wireless communication be desired, e.g., better BLE performance, make the distance between antenna 201-2 and antenna 201-3 smaller. Doing either of the foregoing better couples the one of antenna 201-1 or 201-2 to the radiating dipoles 573 (FIG. 5) of antenna 201-3.

If it is desired to harvest at a different frequency band than 915 MHZ, e.g., a different frequency in the industrial, scientific, and medical (ISM) band, such as 868 MHz, which is employed in Europe, make the size of antenna 201-3 larger. This may be done in either the X direction, the Y direction or both, depending on size constraints for the wireless tag. It should be checked to be sure that the increase in performance that will result for antennas 201-1 and 201-2 does not hurt overall functionality of the wireless tag, which is a side effect which one may not appreciate may occur. Typically, there is no need to modify LC filters 360 or antenna 201-1 for such a change as the frequencies they are blocking remain the same.

If it is desired to use a different material for the tag, adjust the size of each of antennas 201-1, 201-2, and 201-3. They may be made larger or smaller in either the X direction, the Y direction or both, depending on size constraints. Furthermore, the frequency of LC filters 360 may be adjusted, e.g., by adding or removing fingers or changing the length of the inductor. For example, for a material with a higher relative permittivity, Er, where denser material and/or thicker material tend to have higher relative permittivity, the size of each of antennas 201-1, 201-2, and 201-3 may be made smaller in either the X direction, the Y direction or both, depending on size constraints. In such a case, LC filters 360 should be modified to a higher frequency, which may be achieved by removing fingers of the capacitor or making the inductor length shorter.

Note that this type of antenna arrangement is called by its inventors a "Tiki"-shaped antenna system because when the antenna system is rotated counterclockwise 90 degrees the result looks like a Tiki.

All examples and conditional language recited herein are intended for pedagogical purposes to aid the reader in understanding the principles of the disclosed embodiment and the concepts contributed by the inventor to furthering the art and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. An antenna system for use in a wireless tag, comprising:
   a first loop antenna for harvesting wireless energy at a first frequency and being adapted to be connected to a chip of the wireless tag and being located on a first side of the chip;
   a second loop antenna for use in wireless communication in accordance with a wireless protocol, wherein the second loop antenna is adapted to perform the wireless communication using at least a second frequency in a frequency range specified for use by the wireless protocol, the second loop antenna being adapted to be connected to the chip and being located on a second side of the chip that is opposite to the first side of the chip; and
   a third loop antenna for harvesting energy at a third frequency that is lower than both the first frequency and a lowest frequency of the frequency range and being adapted to be connected to the chip, the third loop antenna having a portion that (i) is proximal to a portion of the first loop antenna and a portion of the second loop antenna and (ii) extends substantially parallel to a third side of the chip, the third side of the chip being perpendicular to the first and second chip sides, the third loop antenna also having at least another portion that is substantially parallel to the first and second chip sides;
   wherein a circumference of the third loop antenna is greater than a greatest circumference of the first loop antenna and the second loop antenna.

2. The antenna system of claim 1, wherein at least a portion of the wireless energy at the first frequency was transmitted by a device so that the wireless energy at the first frequency is available to be harvested at the wireless tag using the first loop antenna.

3. The antenna system of claim 1, wherein at least a portion of the wireless energy at the first frequency was transmitted by a device as part of the wireless protocol.

4. The antenna system of claim 1, wherein at least one frequency of the frequency range is the first frequency.

5. The antenna system of claim 1, wherein the frequency range includes frequencies in a vicinity of the first frequency as prescribed by the wireless protocol.

6. The antenna system of claim 5, wherein the wireless protocol is Bluetooth Low Energy (BLE).

7. The antenna system of claim 1, wherein the third frequency is half or less than a lowest one of the first frequency and a minimum frequency of the frequency range.

8. The antenna system of claim 1, wherein at least a portion of the wireless energy at the third frequency was transmitted by a device so that the wireless energy at the third frequency is available to be harvested at the wireless tag using the first loop antenna.

9. The antenna system of claim 1, wherein the third loop antenna has a circumference larger than a circumference of the first loop antenna and a circumference of the second loop antenna combined.

10. The antenna system of claim 1, wherein the third loop antenna further comprises a plurality of inductor-capacitor (LC) filters.

11. The antenna system of claim 10, wherein each of the LC filters is adapted to act as a band stop filters so as to block current at the first frequency.

12. The antenna system of claim 10, wherein each of the LC filters is adapted to act as a band stop filters so as to block currents at frequencies at least in the frequency range.

13. The antenna system of claim 10, wherein the at least another portion of the third loop antenna that is substantially parallel to the first and second chip sides comprises at least two portions that are substantially parallel to the first and second chip sides, wherein each of the LC filters are formed in a respective one of the at least two portions.

14. The antenna system of claim 13, wherein the at least two portions of the third loop antenna that are substantially parallel to the first and second chip sides are located at opposite ends of the portion of the third loop antenna that extends substantially parallel to the third side of the chip.

15. The antenna system of claim 1, wherein the portion of the third loop antenna that is proximal to the portion of the first loop antenna and the portion of the second loop antenna is the portion that extends substantially parallel to the third side of the chip.

16. The antenna system of claim 1, wherein the loop of the third loop antenna has a further portion that extends substantially parallel to the third side of the chip but is distal to the portion of the first loop antenna and the portion of the second loop antenna.

17. The antenna system of claim 10, wherein the portion of the loop of the third loop antenna that is proximal to the portion of the first loop antenna and the portion of the second loop antenna is the portion that extends substantially parallel to the third side of the chip;
wherein the loop of the third loop antenna has a further portion that extends substantially parallel to the third side of the chip but is distal to the portion of the first loop antenna and the portion of the second loop antenna;
and wherein the LC filters effectively substantially electrically disconnect the portion of the loop of the third loop antenna that is proximal to the portion of the first loop antenna and the portion of the second loop antenna from the further portion at the first frequency.

18. The antenna system of claim 1, wherein the wireless tag is a battery-less wireless tag.

19. The antenna system of claim 1, wherein the antenna system is part of a metal layer of an inlay of the wireless tag.

20. The antenna system of claim 1, wherein the circumference of the third loop antenna is a function of a material of a support surface on which the antenna system is adapted to be mounted.

21. The antenna system of claim 1, wherein, in operation, the first loop antenna and the second loop antenna transmit as dipoles while the third loop antenna transmits as a loop antenna.

22. The antenna system of claim 1, wherein the circumference of the first loop antenna is such that the first loop antenna resonates with the chip at the first frequency, the circumference of the second loop antenna is such that the second loop antenna resonates with the chip at least at the second frequency, and the circumference of the third loop antenna is such that the third loop antenna resonates with the chip at least at the third frequency.

23. An inlay, for use in a wireless tag, comprising:
a metallic layer; and
a substrate layer;
wherein the metallic layer is adhered to the substrate layer;
wherein the metallic layer is adapted to have mounted thereon a chip, the chip being rectangular shaped so as to have four sides; and
wherein there is formed of the metal layer at least:
a first loop antenna for harvesting wireless energy at a first frequency and being adapted to be connected to the chip and being located on a first side of the chip;
a second loop antenna for use in wireless communication in accordance with a wireless protocol, wherein the second loop antenna is adapted to perform the wireless communication using at least a second frequency in a frequency range specified for use by the wireless protocol, the second loop antenna being adapted to be connected to the chip and being located on a second side of the chip that is opposite to the first side of the chip; and
a third loop antenna for harvesting energy at a third frequency that is lower than both the first frequency and a lowest frequency of the frequency range and being adapted to be connected to the chip, the third loop antenna having a portion that (i) is proximal to a portion of the first loop antenna and a portion of the second loop antenna and (ii) extends substantially parallel to a third side of the chip, the third side of the chip being perpendicular to the first and second chip sides, the third loop antenna also having at least another portion that is substantially parallel to the first and second chip sides;
wherein a circumference of the third loop antenna is greater than a greatest circumference of the first loop antenna and the second loop antenna.

24. A wireless tag, comprising:
a chip, the chip having four sides and being rectangular in shape,
a first loop antenna for harvesting wireless energy at a first frequency and being adapted to be connected to a chip of the wireless tag and being located on a first side of the chip;
a second loop antenna for use in wireless communication in accordance with a wireless protocol, wherein the second loop antenna is adapted to perform the wireless communication using at least a second frequency in a frequency range specified for use by the wireless protocol, the second loop antenna being adapted to be connected to the chip and being located on a second side of the chip that is opposite to the first side of the chip; and
a third loop antenna for harvesting energy at a third frequency that is lower than both the first frequency and a lowest frequency of the frequency range and being adapted to be connected to the chip, the third loop antenna having a portion that (i) is proximal to a portion of the first loop antenna and a portion of the second loop antenna and (ii) extends substantially parallel to a third side of the chip, the third side of the chip being perpendicular to the first and second chip sides, the third loop antenna also having at least another portion that is substantially parallel to the first and second chip sides;

wherein a circumference of the third loop antenna is greater than a greatest circumference of the first loop antenna and the second loop antenna.

\* \* \* \* \*